Dec. 22, 1936.  E. CHARLESWORTH  2,064,886
WIRE REEL
Filed Jan. 4, 1936
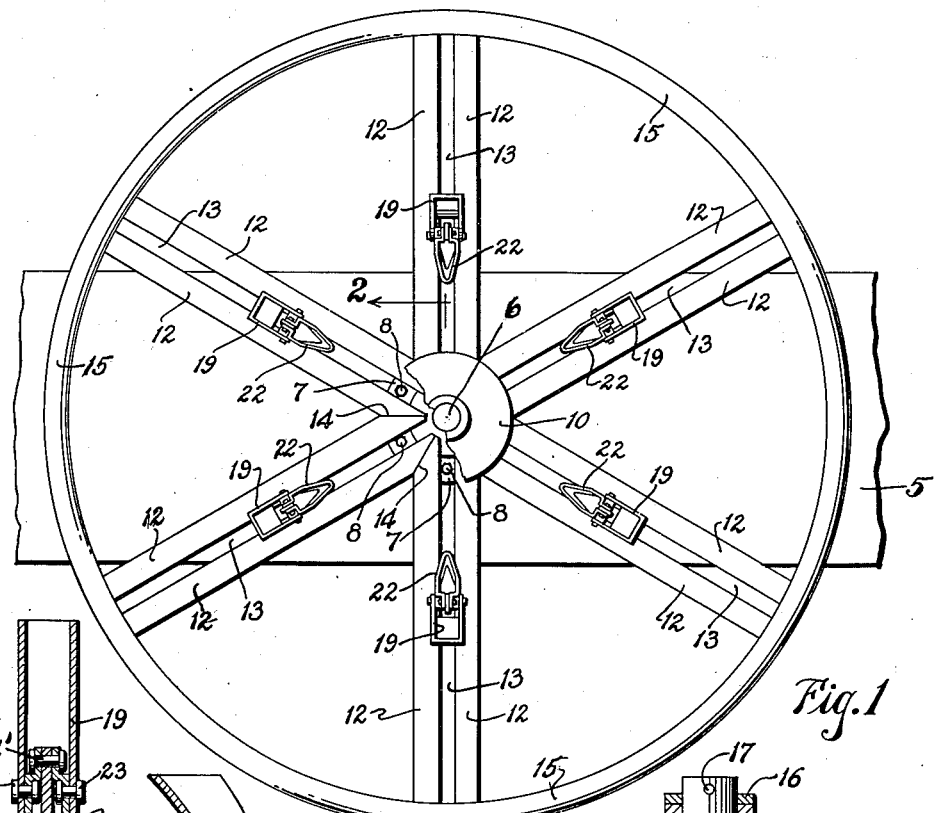
Fig. 1
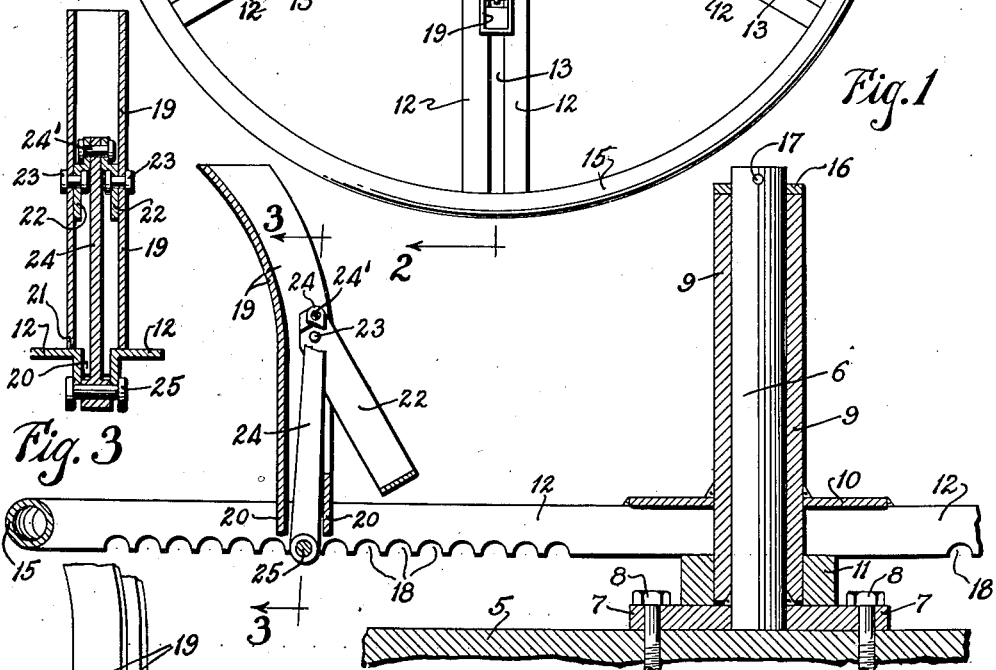
Fig. 3
Fig. 2
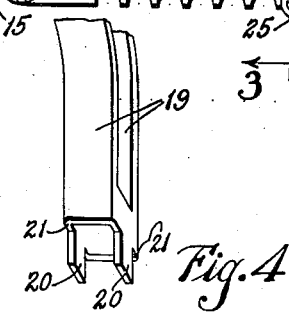
Fig. 4
INVENTOR,
Eugene Charlesworth,
BY
ATTORNEY.

Patented Dec. 22, 1936

2,064,886

UNITED STATES PATENT OFFICE 2,064,886

WIRE REEL

Eugene Charlesworth, Venice, Calif.

Application January 4, 1936, Serial No. 57,567

6 Claims. (Cl. 242—113)

My invention relates to wire reels of the character used to receive a quantity of wire thereon and to hold it to be paid out as the wire is used, and particularly as used by telephone and telegraph companies in stringing their wires from pole to pole, or place to place, or even in drawing them through conduits.

My invention relates more particularly to wire reels of the character referred to in which the reel body is somewhat like a wheel, having a hub portion and a rim with spokes or arm portions radially disposed therebetween, and with holding arms or fingers on the spoke or arm portions for directly holding the wire in place on said reel.

The particular object of my invention is to provide in such a wire reel a construction and arrangement in which these holding fingers or arms can be easily and readily adjusted radially and locked in adjusted positions. In reels in use, these holding fingers are not adjustable, or, if adjustable radially, the adjustments can only be accomplished by unscrewing nuts or the like, which are underneath the reel and most difficult to get to, and require the use of a wrench in order to tighten or to loosen them, and this consumes considerable time.

Other objects and advantages will be apparent from the drawing, taken with the following description of one embodiment of my invention.

In the drawing:

Figure 1 is a top plan view of a wire reel embodying my invention, with a small portion broken away;

Figure 2 is an enlarged fragmentary, vertical sectional view thereof, taken on line 2—2 of Fig. 1;

Figure 3 is a sectional view taken on line 3—3 of Fig. 2, being through one of the wire holding fingers; and Figure 4 is an enlarged fragmentary, perspective view of the lower or attached end of one of the wire holding fingers.

Referring now in detail to the drawing, my improved wire reel can be supported to turn upon a vertical axis, or it can be mounted to turn about a horizontal axis, or tilted to an angle, as may be to the best advantage of those using it.

To this end, I have shown a supporting member 5, which can be of any kind or construction suitable for the place of use. To the support is bolted or otherwise secured a spindle 6, having a base or disc 7, secured by the bolts 8, 8, to said support. Mounted to turn on said spindle 6, is a sleeve or hub-like member 9, having a disc or collar portion 10 welded or otherwise secured thereto a distance above its lower end, the lower end of said sleeve being seated in a collar or bearing member 11, resting upon the disc or base 7 of the spindle.

I have shown six arms or spoke-like members, each composed of two angle irons, 12, 12, spaced apart to form therebetween a slotway 13. The inner ends of said arms or members are inserted under the disc or collar portion 10 of the bearing sleeve 9, to abut against the said sleeve, and are welded thereto, and may be welded to each other with a beveled fit, as indicated at 14, 14, Fig. 1.

The outer ends of said arms or spoke-like members 12, 12, are shown fitted to a pipe-like rim 15 and welded or otherwise secured thereto and so as to make said rim, spoke-like members and said center sleeve one rigid, unitary structure turnable on the spindle 6. A washer 16 may be placed over the upper end of said spindle 6, over the upper end of the sleeve 9, with a cotter pin 17 through the end of the spindle 6, as indicated in Fig. 2, if desired, or any other fastening means may be used.

The reel arms 12, 12, are provided on their under sides with notches 18, equally spaced along the under side of each of said arms or spoke-like members, and as shown in Fig. 2. These notches are spaced to provide adjustment positions for the wire holding fingers, now to be described.

Referring to Figs. 2, 3, and 4, I will describe the wire holding fingers, each of which consists of a channel-like body portion 19, curved slightly, as indicated, with the open side of the channel member toward the center of the reel. The lower end of the body is shown cut away to provide two spaced extension portions, as 20, 20, adapted to fit in the slotway 13 of the reel arm 12, with the shoulder portions 21, 21, resting upon the upper surfaces of the two members 12, 12, as indicated.

A lever 22, formed of a strip of metal bent into a loop with its ends pivotally connected between the sides of the channel body 19, as at 23, 23, has the toe portions of its ends turned inwardly toward each other and connected with the upper end of a link 24, the lower end of which extends down through the body 19 and through the slotway 13, and is provided at its lower end with a pin 25 adapted to fit into the opposite notches 18, 18, of two members 12, 12.

As the outer end of the lever 22, is raised and lowered by hand, it will be understood that the link 24 is lowered and raised, respectively. This is due to the toe or end of the lever, beyond its pivotal support, being connected with the upper end of said link 24, as at 24'. Thus when it is desired to release one of said wire holding fingers 19, it is only necessary to raise the lever 22, which will lower the link 24, and the pin 25 thereof in the notches 18, whereupon said wire holding finger can be adjusted radially inwardly or outwardly, as desired, along the reel arms 12. When the lever 22 is pressed downwardly, said link 24 is raised and the pin 25 drawn tightly into the notches 18, and said finger is locked in position. The pivot 24' in the end or toe of said link 24, it will be seen moves over the supporting pivot at 23 for said lever, thus locking the lever 22 in its down position until manually pulled out and raised for the purpose of releasing the wire holding finger 19 for adjustment. Each of the reel arms is provided with one of the wire holding fingers 19, as indicated in Fig. 1.

Thus I have provided an improved, practical and efficient wire reel of the character referred to, and while I have shown and described in detail one practical embodiment of my invention, I do not limit the invention to the details of construction and arrangement shown, except as I may be limited by the hereto appended claims forming a part of the specification.

I claim:

1. A wire reel of the character referred to having a wheel-like body with spoke-like portions, means for rotatably supporting the same, a wire-holding finger adjustably mounted on each of the spoke-like portions of the wheel body, each finger having a lever pivotally connected therewith, and means operable thereby for locking said finger to the spoke-like part of said reel.

2. A wire reel including a wheel-like body having spoke-like portions forming longitudinally extending slotways therein, means for rotatably supporting the said body, wire-holding fingers adjustably mounted on said spoke-like portions, each having a part above said spoke-like portion and a movable part below said spoke-like portion, and means for moving said parts toward each other in interlocking engagement with said spoke-like portions.

3. A wire reel including a wheel-like body having hub, rim and spoke elements, said spoke elements having longitudinally extending slotways therein, wire-holding fingers seated on said spoke elements with parts extending into said slotways, and means for interlocking the ends of said wire-holding fingers in different positions of adjustment along said spoke elements, said means including a lever manually movable and a part moved thereby adapted to lock and release said finger.

4. A wire reel including a wheel-like body having hub, rim and spoke elements, wire holding fingers on said spoke elements, said spoke elements having a series of notches formed therein for adjustment of said fingers therealong, and manually operable means on said fingers to interlock with said notches.

5. A wire reel including a body having radially disposed slotways, means for rotatably supporting said body, wire-holding fingers adjustably mounted in said slotways, each of said fingers carrying a movable part on the underside of its slotway and adapted to be interlocked with said body through said slotway, and a manually operable member carried by said finger for locking and releasing said finger for radial adjustment along said slotway.

6. In a wire reel of the character referred to, a body having hub, rim and spoke elements, said spoke elements having slotways therein and notches along its under side, wire holding fingers interfitting said spoke elements and adjustable along said slotways, means carried by said fingers for interfitting with said notches, and manually operable means for operating said latter means for locking and releasing said fingers for adjustment.

EUGENE CHARLESWORTH.